(12) United States Patent
Kaneko et al.

(10) Patent No.: US 11,281,609 B2
(45) Date of Patent: Mar. 22, 2022

(54) ARITHMETIC PROCESSOR AND CONTROL METHOD FOR ARITHMETIC PROCESSOR

(71) Applicant: Preferred Networks, Inc., Tokyo (JP)

(72) Inventors: Hiroya Kaneko, Tokyo (JP); Kohei Takahashi, Tokyo (JP); Takuya Yamauchi, Saitama (JP)

(73) Assignee: Preferred Networks, Inc., Tokyo (JP)

( * ) Notice: Subject to any disclaimer, the term of this patent is extended or adjusted under 35 U.S.C. 154(b) by 0 days.

(21) Appl. No.: 16/805,999

(22) Filed: Mar. 2, 2020

(65) Prior Publication Data

US 2020/0293473 A1 Sep. 17, 2020

Related U.S. Application Data

(60) Provisional application No. 62/816,971, filed on Mar. 12, 2019.

(51) Int. Cl.
*G06F 13/28* (2006.01)
*G06F 7/78* (2006.01)
*G06F 9/38* (2018.01)

(52) U.S. Cl.
CPC ............... *G06F 13/28* (2013.01); *G06F 7/78* (2013.01); *G06F 9/3836* (2013.01); *G06F 9/3877* (2013.01); *G06F 2213/0026* (2013.01)

(58) Field of Classification Search
CPC .......... G06F 13/28; G06F 7/78; G06F 9/3836
See application file for complete search history.

(56) References Cited

U.S. PATENT DOCUMENTS

| | | | | |
|---|---|---|---|---|
| 5,434,976 A | * | 7/1995 | Tan | H04L 49/90 709/213 |
| 10,338,965 B2 | * | 7/2019 | Brueggen | G06F 9/5016 |
| 2009/0307386 A1 | * | 12/2009 | Jin | G06F 13/28 710/25 |
| 2013/0151747 A1 | * | 6/2013 | Zhang | G06F 9/505 710/310 |

\* cited by examiner

*Primary Examiner* — Henry Tsai
*Assistant Examiner* — Christopher A Daley
(74) *Attorney, Agent, or Firm* — IPUSA, PLLC

(57) ABSTRACT

One aspect of the present disclosure relates to an arithmetic processor including a detection unit that detects instruction information, wherein an instruction including a processing instruction to be performed after completion of DMA (Direct Memory Access) in a DMA request instruction is described in the instruction information and a data processing unit that uses data transferred by the DMA request instruction to execute an operation corresponding to the processing instruction based on the instruction information detected by the detection unit.

20 Claims, 12 Drawing Sheets

FIG.1 FIRST EMBODIMENT

FIG.2

DMA Header

FOLLOWING INFORMATION ITEMS ARE STORED.

| ch (CHANNEL) | size (TRANSFERRING SIZE) | srcadr (SOURCE ADDRESS) | dstadr (DESTINATION ADDRESS) |
|---|---|---|---|

SINCE dstadr IS NOT USED IN DMA DEVICE IN ARCHITECTURE OF EMBODIMENT, INFORMATION IS ENCODED HEREIN.

OPERATION OF START PACKET DETECTION UNIT IN FIG. 2

OPERATION OF INSTRUCTION GENERATION UNIT IN FIG. 2

OPERATION OF SEQUENCER IN FIG. 2

EXEMPLARY DMA REQUEST 1

FIG.11

EXEMPLARY DMA REQUEST 2

DMA REQUEST (DMA HEADER)

| ch | size | srcadr | dstadr |
|---|---|---|---|
| 0 | 16 | 0 | id |

OPERATION DB

| id | opid | len |
|---|---|---|
| 1 | int_add | 16 |
| 2 | int_sub | 16 |

FIG.12

FOURTH EMBODIMENT (EXEMPLARY DMA REQUEST 3)

DMA REQUEST (DMA HEADER)

| ch | size | srcadr | dstadr |
|---|---|---|---|
| 0 | 16 | 0 | flg, id |

ARITHMETIC PROCESSOR AND CONTROL METHOD FOR ARITHMETIC PROCESSOR

CROSS-REFERENCE TO RELATED APPLICATIONS

The present application is based on and claims priority to US provisional application No. 62/816,971 filed on Mar. 12, 2019 with the USPTO, the entire contents of which are hereby incorporated by reference.

BACKGROUND

1. Technical Field

The disclosure herein relates to an arithmetic processor and a control method for the arithmetic processor.

2. Description of the Related Art

Conventionally, systems that perform large-scale arithmetic operations through cooperation of accelerator cards having PCIe interfaces are used, for example. In these systems, there are some cases where information may be exchanged between mutual PCIe boards via an upper node having the multiple PCIe interfaces as lower nodes.

In order to improve the overall performance of the system, it is necessary to efficiently perform group communication, arbitrary arithmetic operations or the like at the upper node. In DMA (Direct Memory Access) for use in data transferring between the lower nodes and the upper node, however, it is generally difficult to change instructions to improve the efficiency.

SUMMARY

The present disclosure relates to an arithmetic processor where an instruction including an operation to be executed after completion of the DMA is described in a DMA request instruction.

One aspect of the present disclosure relates to an arithmetic processor, comprising: a detection unit that detects instruction information, wherein an instruction including a processing instruction to be performed after completion of DMA (Direct Memory Access) in a DMA request instruction is described in the instruction information; and a data processing unit that uses data transferred by the DMA request instruction to execute an operation corresponding to the processing instruction based on the instruction information detected by the detection unit.

Another aspect of the present disclosure relates to a control method for an arithmetic processor, comprising: detecting information, wherein an instruction including a processing instruction to be performed after completion of DMA (Direct Memory Access) in a DMA request instruction is described in the information; and processing an operation using data transferred by the DMA request instruction based on the detected information.

In this manner, even after DMA communication has been initiated, correspondence can be updated. Also, the correspondence can be appropriately configured in an architecture having a large number of nodes that are coupled in multiple stages.

BRIEF DESCRIPTION OF THE DRAWINGS

Other objects and further features of the present disclosure will be apparent from the following detailed description when read in conjunction with the accompanying drawings, in which:

FIG. 2 illustrates an exemplary DMA header for use in DMA according to one embodiment of the present disclosure;

FIG. 11 illustrates examples of information stored in a DMA header in a DMA request and information stored in an operation database DB according to the third embodiment of the present disclosure; and FIG. 12 illustrates exemplary information stored in a DMA header in a DMA request according to a fourth embodiment of the present disclosure.

DETAILED DESCRIPTION

First Embodiment

Figure 1:
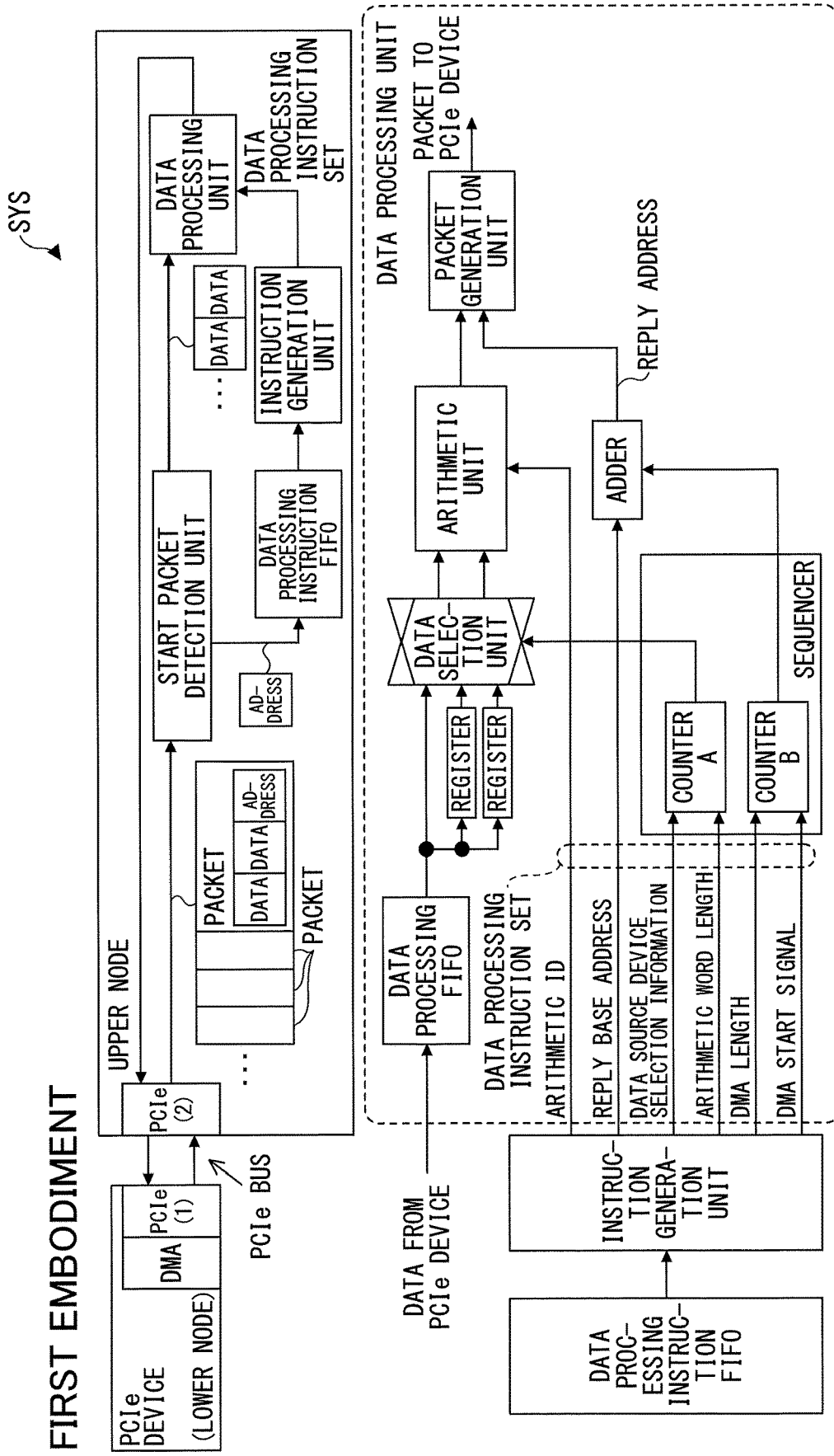
FIG. 1 illustrates an exemplary system SYS according to a first embodiment of the present disclosure.
Figure 6:
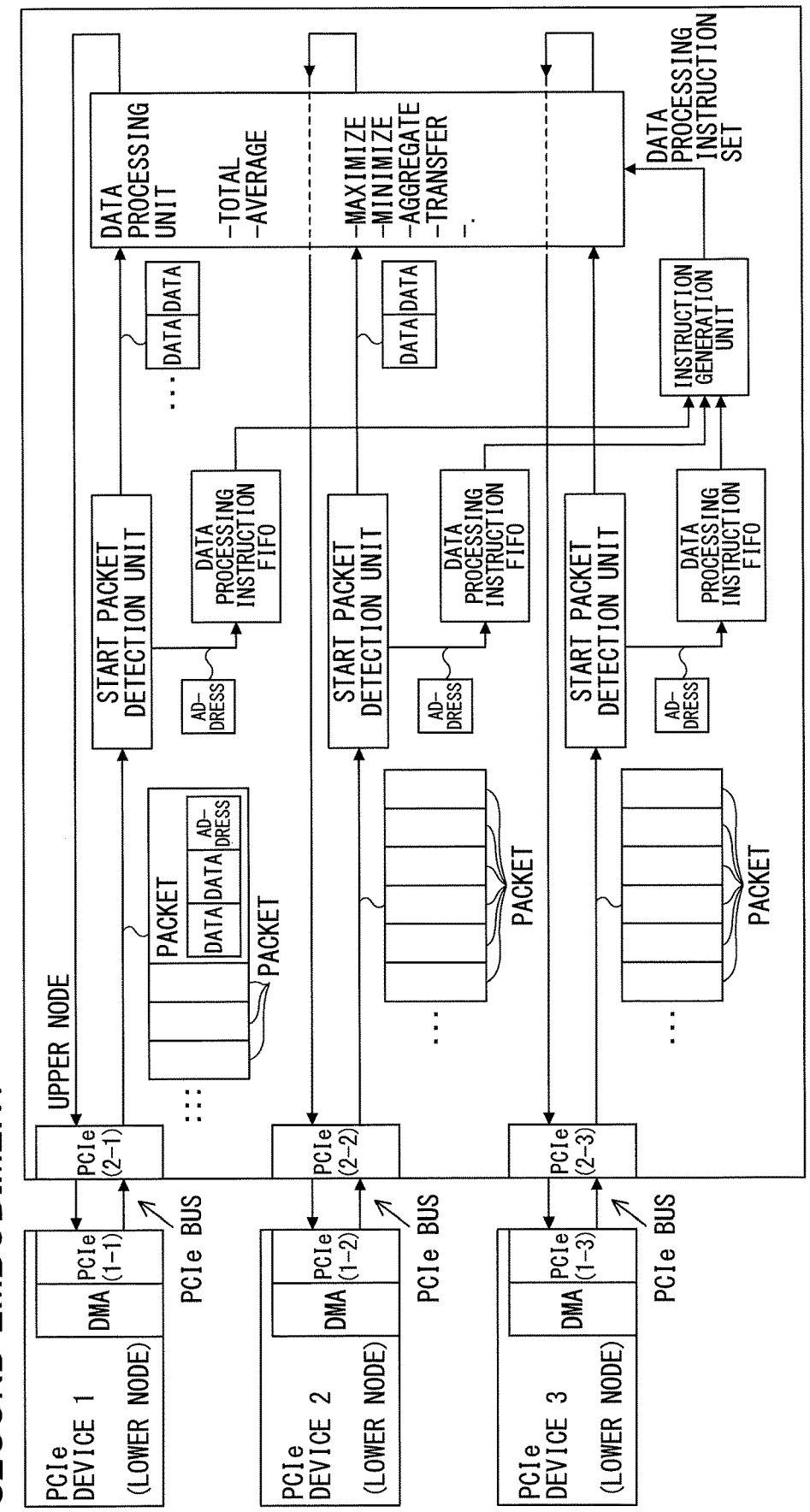
FIG. 6 illustrates an exemplary system SYS according to a second embodiment of the present disclosure.
Figure 7:
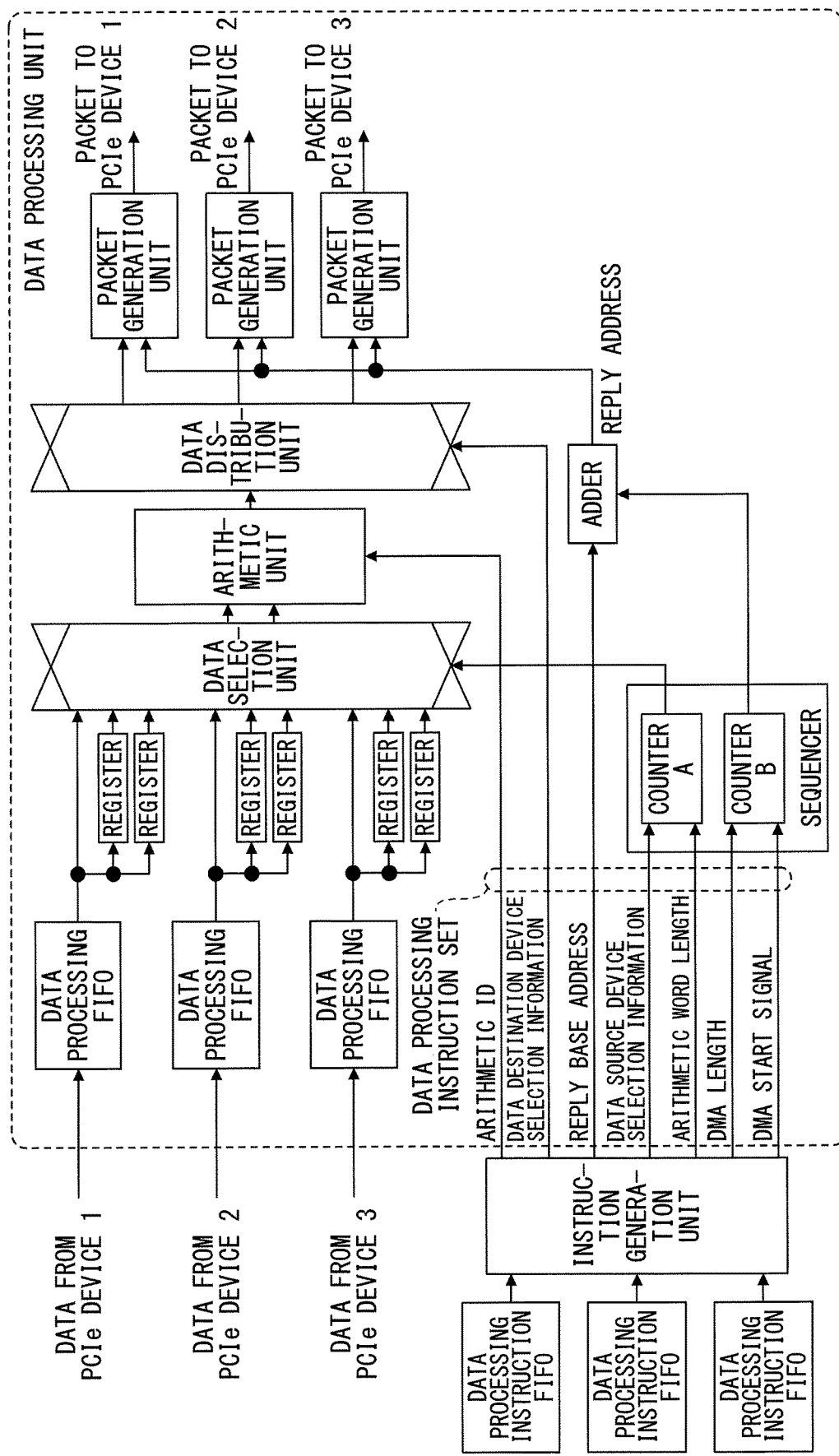
FIG. 7 is a block diagram for illustrating an example of an instruction generation unit and a data processing unit in FIG. 6 according to one embodiment of the present disclosure.
Figure 10:
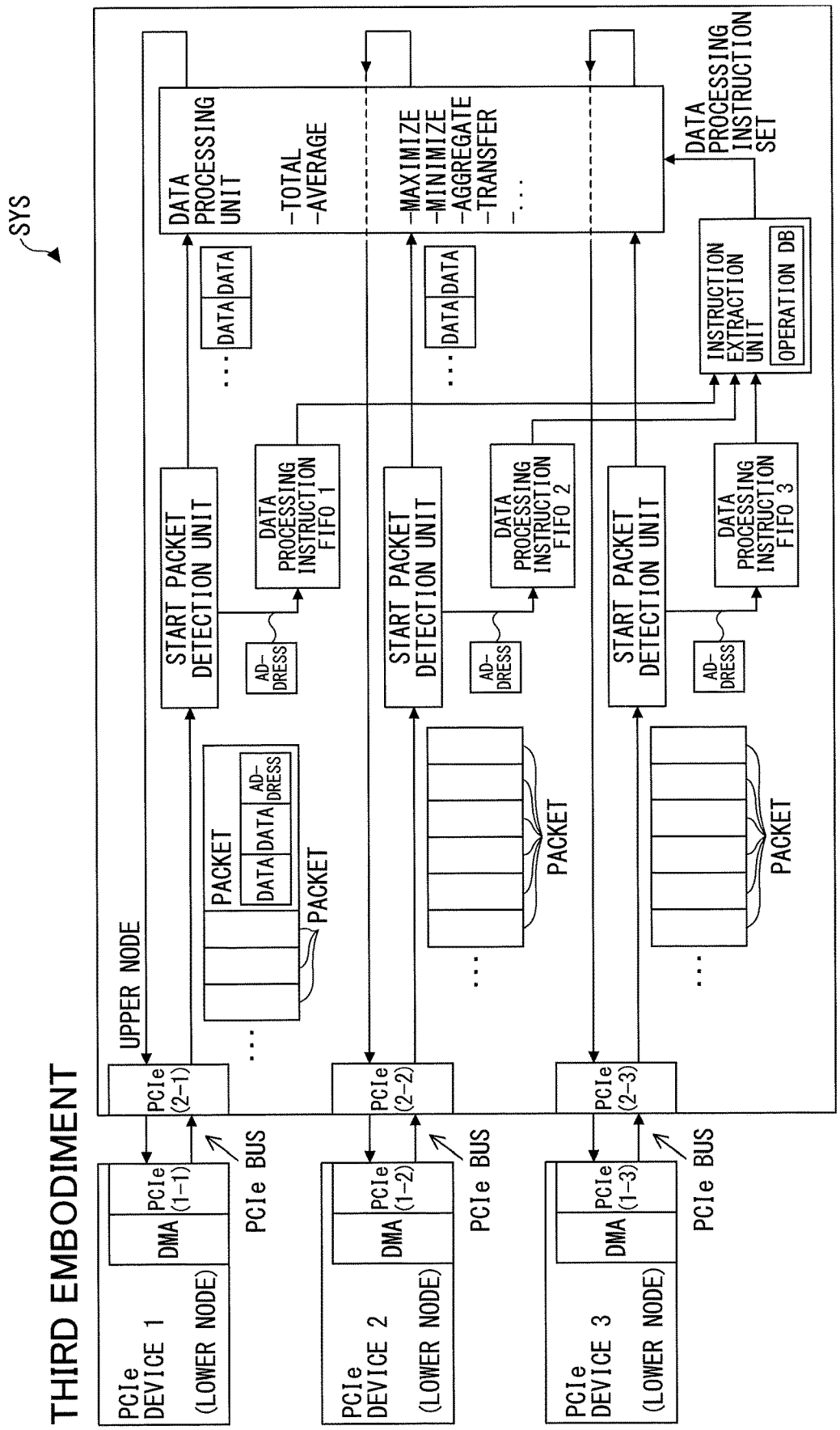
FIG. 10 illustrates an exemplary system SYS according to a third embodiment of the present disclosure.

FIG. 1 illustrates an exemplary system SYS according to the first embodiment. The top side in FIG. 1 illustrates a block diagram of a main part of the system SYS, and the bottom side in FIG. 1 illustrates an exemplary data processing unit included in an upper node in the top side in FIG. 1. In FIG. 1, solid lines represent signal lines for carrying signals. One or more signal lines may carry signals in the upper node. The signal lines as illustrated in FIGS. 6, 7 and 10 are also similar.

For example, the system SYS has a PCIe device serving as a lower node and an upper node coupled to the PCIe device via a PCIe bus.

The PCIe device has a DMA controller and a PCIe interface unit (1) mounted onto a PCIe board, for example. The DMA controller operates based on information stored in a DMA header as illustrated in FIG. 2 and issues a DMA request instruction to the PCIe interface unit (1) to transmit data sequentially. The PCIe interface unit (1) generates packets including the data sequentially transferred from the DMA controller and transmits the packets to the upper node sequentially.

For example, the upper node has a PCIe interface unit (2) coupled to the PCIe device, a start packet detection unit, a data processing instruction FIFO, an instruction generation unit and a data processing unit. For example, the start packet detection unit, the data processing instruction FIFO, the instruction generation unit and the data processing unit are included in an arithmetic processor formed as a CPU, a GPU or a dedicated hardware logic or the like which are incorporated in the upper node. The arithmetic processor may be formed as a semiconductor chip or a semiconductor package. The arithmetic processor may be included in a semiconductor chip as a functional block (macro).

The PCIe interface unit (2) in the upper node receives packets from the PCIe device, detects and corrects missing of the PCIe packets and/or out-of-order PCIe packets and then transmits the packets to the start packet detection unit sequentially. In the start packet of the packets transferred from the PCIe interface unit (2) to the start packet detection unit, a destination address "dstadr" included in a DMA header described with reference to FIG. 2 and data for use in data processing executed in response to an instruction are stored.

Instruction information actually including an instruction or the like is stored in an area of the destination address "dstadr". Accordingly, according to this embodiment, if data is transmitted in the DMA, the data and an instruction for causing an arithmetic unit to process the data can be jointly transmitted. In this manner, the correspondence between the data transferred in the DMA and the instructions for processing the data can be easily and securely stored.

Also, if the destination address "dstadr" in the DMA header indicates instruction information including an instruction or the like, the DMA controller performs the DMA transmission as the destination address "dstadr". As a result, for each DMA transferring occasion, the value indicative of the instruction information is incremented. However, it is not problematic, because the instruction information arrives at the upper node as the destination address "dstadr" in the first DMA transferring occasion. The DMA controller performs the DMA transferring without recognizing whether the destination address "dstadr" is correct. The PCIe interface unit (1) also packetizes the data transferred in the DMA from the DMA controller for transmission to the upper node. In other words, the existing DMA controller and the existing PCIe interface unit can be used to transmit the instruction information including an instruction or the like to the upper node without changing hardware items in the PCIe device. Note that the start packet detection unit is one exemplary detection unit for detecting the instruction information where instructions including a processing instruction are described. In the present embodiment, the instruction information is included in a start packet, and the start packet detection unit detects the instruction information through detection of the start packet.

The start packet detection unit detects the start packet including a DMA header, which is at the start of the DMA transferring, from the packets received from the PCIe device via the PCIe interface unit (2). The start packet detection unit extracts the destination address "dstadr" from an address area of the start packet. The start packet detection unit transmits the extracted destination address "dstadr" to the data processing instruction FIFO. Here, the entity of the extracted destination address "dstadr" is the instruction information including an instruction or the like for causing an arithmetic unit to process the data transferred in the DMA. Also, the start packet detection unit extracts data included in the packets and forwards the extracted data to the data processing unit sequentially.

The data processing instruction FIFO stores the instruction information included in the start packet as the destination address "dstadr" sequentially. The information stored in the data processing instruction FIFO is fetched by the instruction generation unit in the storage order.

The instruction generation unit generates information required for controlling data processing, for example, an instruction code, a reply address after data processing or others, based on the instruction information and provides the generated information to the data processing unit. The information required for controlling data processing such as an instruction code, a reply address after data processing or others may be also referred to as a data processing instruction set.

Note that although an example where the lower node and the upper node are coupled to each other via the PCIe bus is illustrated in FIG. 1, they may be coupled to each other via buses according to other communication standards as long as the DMA transferring can be implemented. In this case, instead of the PCIe interface units (1) and (2), communication interface units according to other communication standards may be provided.

In the bottom side in FIG. 1, the data processing unit has a data processing FIFO, a predetermined number of registers, a data selection unit, a sequencer including counters A and B, an arithmetic unit, an adder and a packet generation unit, for example. The data processing unit processes data transferred in the DMA after completion of the DMA based on the instruction information detected by the start packet detection unit.

Here, the data processing instruction set generated by the instruction generation unit based on information fetched from the data processing instruction FIFO may include an arithmetic ID, a reply base address, data source device selection information, an arithmetic word length, a DMA length and a DMA start signal, for example.

The arithmetic ID may be implemented as an instruction code, for example, and may be information for identifying an operation to be executed by the arithmetic unit of the data processing unit and be provided to the arithmetic unit. Instructions identified with the arithmetic IDs may be various arithmetic instructions such as an aggregation instruction, a transferring instruction or the like. For example, the aggregation instruction is used to perform arithmetic operations on data pieces transferred from the multiple PCIe devices and transfer an arithmetic result to any of the PCIe devices. Note that the aggregation instruction and the transferring instruction are used in the second embodiment.

The reply base address indicates a base address for a storage area for returning data (arithmetic result) obtained through data processing.

The data source device selection information includes information for identifying a lower node that transmits data for use in arithmetic operations. The data source device selection information may include information to indicate from which register the data selection unit transfers the data to the arithmetic unit. Specifically, the data source device selection information may include information (information corresponding to a portion of instruction codes) to select which data is delivered to the arithmetic unit for use in operations. In this embodiment, since only one lower node (PCIe device) is coupled to the upper node, identification information for the lower node included in the data source device selection information is fixed to the PCIe device as illustrated in FIG. 1.

The arithmetic word length indicates the length (size) of incoming data required by the arithmetic unit to execute a single operation. The arithmetic word length may be changed depending on types of instructions corresponding to the arithmetic IDs.

The DMA length indicates a transferring length in the case where incoming data required for operations that are executed a predetermined number of times corresponding to a single instruction is transferred in the DMA. The DMA length may be specified with the number of words or the number of bytes, for example. The DMA start signal is a signal for identifying the start or top of DMA transferring for each instruction.

The data processing FIFO sequentially stores data transferred from the start packet detection unit. A register is a storage area provided for each upper node to store any value for use in operations. The data selection unit selects at least one of data stored in the data processing FIFO and data stored in each register based on a selection control signal provided from counter A and outputs the selected data to the arithmetic unit.

In this embodiment, data transferred in the DMA is stored in the data processing FIFO, instead of the data transferred in the DMA being stored in a memory. As a result, the DMA transferring can be achieved without use of the destination address "dstadr". Accordingly, an area of the destination address "dstadr" in the DMA header as illustrated in FIG. 2 is not used for the DMA transferring at the upper node.

The sequencer controls operations of the data processing unit based on various types of information generated by the instruction generation unit. For example, the sequencer has counter A and counter B.

The counter A is incremented for each reception of one word of data at the data processing FIFO, for example, and if the counter value reaches the arithmetic word length, outputs a selection control signal for causing the data selection unit to make data selection based on the data source device selection information. Whenever the received data reaches the arithmetic word length, the counter A outputs the selection control signal to the data selection unit, which is enabled to cause the arithmetic unit to execute instructions transferred in the DMA together with the data without waiting execution of a predetermined number of times or completion of the DMA.

The counter B is activated in response to the DMA start signal and is incremented for each reception of one word of data at the data processing FIFO. The counter value is provided to the adder. Also, when the counter value reaches the DMA length, the counter value of the counter B is reset to "0". The counter value provided from the counter B is used for generation at the adder of a reply address for replying an operation result by the arithmetic unit, detection of a start packet at the start packet detection unit or the like.

The arithmetic unit has at least one of an adder, a multiplier, a logical arithmetic unit, a product sum arithmetic unit and so on to perform at least one of an aggregation instruction, a transferring instruction and various arithmetic instructions, for example. The various types of specific arithmetic units included in the arithmetic unit may be one or both of a floating point arithmetic unit and a fixed point arithmetic unit. The arithmetic unit provides operation results obtained in arithmetic operations or data transferred in transferring instructions to the packet generation unit.

The adder adds counter values received from the counter B to a reply base address sequentially to generate a reply address and provides the generated reply address to the packet generation unit. The packet generation unit generates a packet, whose destination is the reply address provided from the adder, including an operation result provided from the arithmetic unit and provides the generated packet to the PCIe interface unit (2). Then, the operation result is transferred from the PCIe interface unit (2) to a PCIe device (lower node) having the assigned reply address.

FIG. 2 illustrates an exemplary DMA header for use in the DMA according to one embodiment of the present disclosure. Specifically, FIG. 2 illustrates an exemplary DMA request instruction. A DMA header according to the present embodiment includes a channel "ch", a transferring size "size", a source address "srcadr" and a destination address "dstadr". The channel "ch" is used to specify which channel is used in the case of the DMA controller having multiple channels. Accordingly, if the DMA uses only one channel or if the DMA controller has only one channel, no area for the channel "ch" may be provided in the DMA header.

The transferring size "size" indicates the size of data transferred in the DMA. The source address "srcadr" indicates a start address of a storage area where data to be transferred in the DMA is stored. The destination address "dstadr" indicates a start address of a storage area where the DMA-transferred data is to be stored.

The DMA controller fetches data stored in an area indicated in the source address "srcadr" and delivers the fetched data to the destination address "dstadr" for DMA transferring. For example, the transferring size "size" is decremented for each DMA transferring occasion while the source address "srcadr" and the destination address "dstadr" are incremented. Then, the DMA transferring is repeated until the transferring size "size" reaches 0.

Here, in the architecture where an upper node serving as a DMA source has queues for respective output devices and has no source address, the source address "srcadr" may not be used, or arbitrary information may be stored.

Note that if the destination device of the DMA is a queue, a buffer or the like such as a FIFO having the unchanged destination address, the destination address "dstadr" may not be used. Then, according to the present embodiment, instruction information including an instruction or the like is embedded in an area of the destination address "dstadr" unused in the DMA header. After compression, code conversion or the like, the resulting instruction information may be embedded (encoded) into the destination address "dstadr". Alternatively, the instruction information may be embedded as it is.

Figure 3:
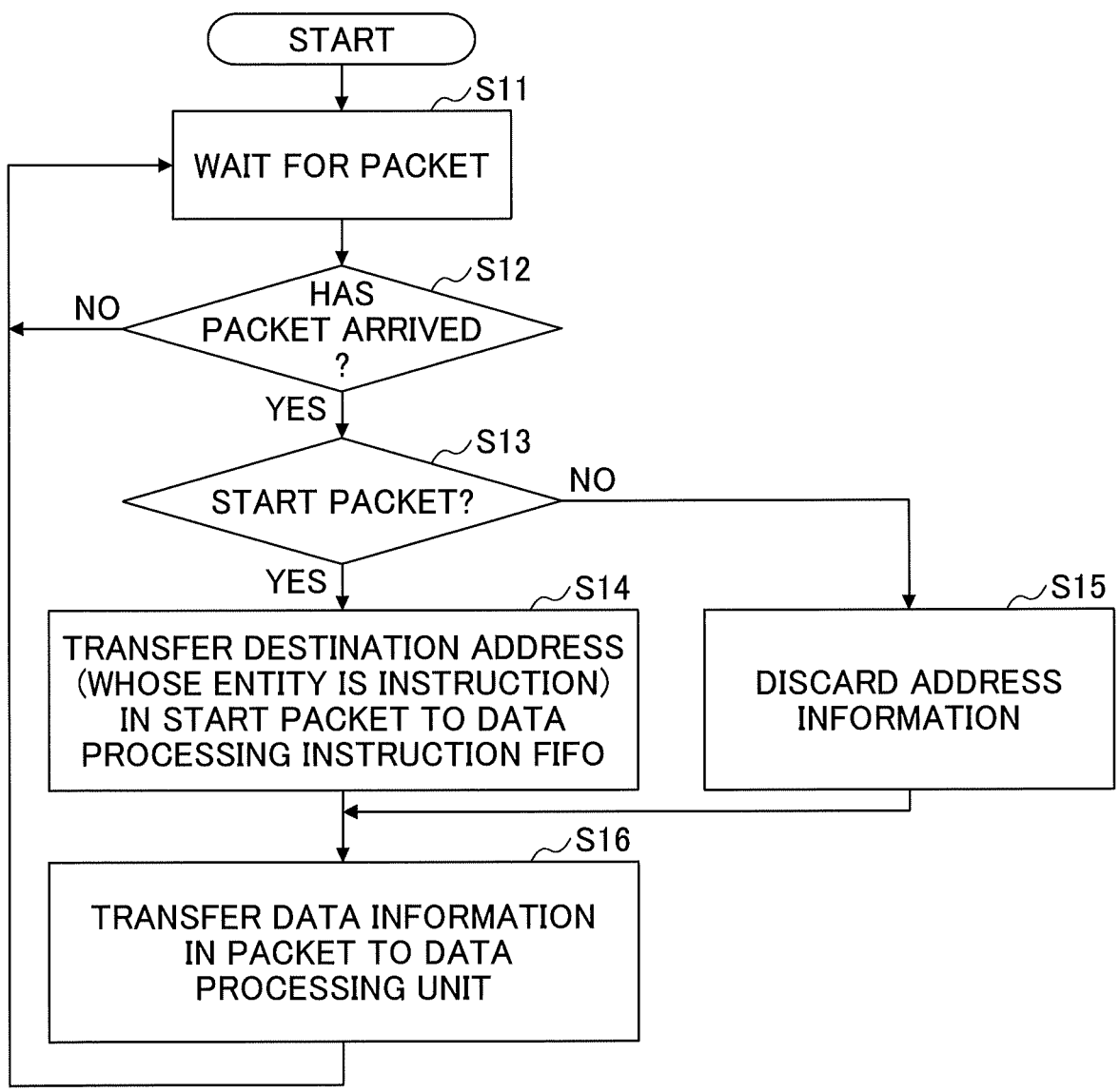
FIG. 3 is a flowchart for illustrating an operation of a start packet detection unit in FIG. 2 according to one embodiment of the present disclosure.

FIG. 3 is a flowchart for illustrating an operation of the start packet detection unit in FIG. 2. Specifically, FIG. 3 illustrates an exemplary control method for an arithmetic processor.

The start packet detection unit waits a packet at step S11, determines whether the packet has arrived at step S12 and if the packet has arrived, determines whether the arriving packet is a start packet at step S13. On the other hand, if no packet has arrived, steps S11 and S12 are repeated until arrival of the packet.

If it is determined at step S13 that the packet is the start packet, at step S14, the start packet detection unit transfers the destination address "dstadr" (whose entity is instruction information) included in the start packet to the data processing instruction FIFO. On the other hand, if it is not determined at step S13 that the packet is not the start packet, at step S15, the start packet detection unit discards address information included in the packet and leaves only data.

After steps S14 and S15, at step S16, the start packet detection unit transfers the data included in the packet to the packet processing unit and returns to step S11.

According to the operation as illustrated in FIG. 3, the upper node can perform operations on the DMA-transferred data based on the instruction information embedded into the DMA header.

Specifically, an arbitrary operation can be inserted between two DMA transferring occasions without pre-configuration.

Also, by embedding the instruction information including an instruction or the like into the DMA header, correspondence between the data transferred to the upper node in the DMA and operations performed by using the data can be stored without transferring information separately from the DMA transferring. In addition, the correspondence can be stored without use of a data area for the DMA transferring.

Furthermore, since the DMA controller or the like in the lower node operates under recognition of the instruction information as the destination address "dstadr", the DMA controller or the like can use the existing DMA controller to transfer data and an instruction to the upper node in the DMA.

On the other hand, if the instruction information is not embedded into the DMA header, for example, processing information for indicating how to process the DMA-transferred data must be transferred from the lower node to the upper node. In this case, since the DMA transferring is not synchronized with transferring the processing information, it is difficult to store the correspondence between data and operations on the data. Also, if data is processed by sequentially conducting the DMA transferring to multiple nodes coupled in a cascade manner, as in the service chaining manner where multiple services are chained and implemented as a single service, it is difficult to set the correspondence appropriately.

Furthermore, in the case where the processing information is embedded as data for the DMA transferring, even if the correspondence can be stored, reception control for the data may be complicated because of mismatch between the data size for use in data processing and the DMA transferring size, for example.

Figure 4:
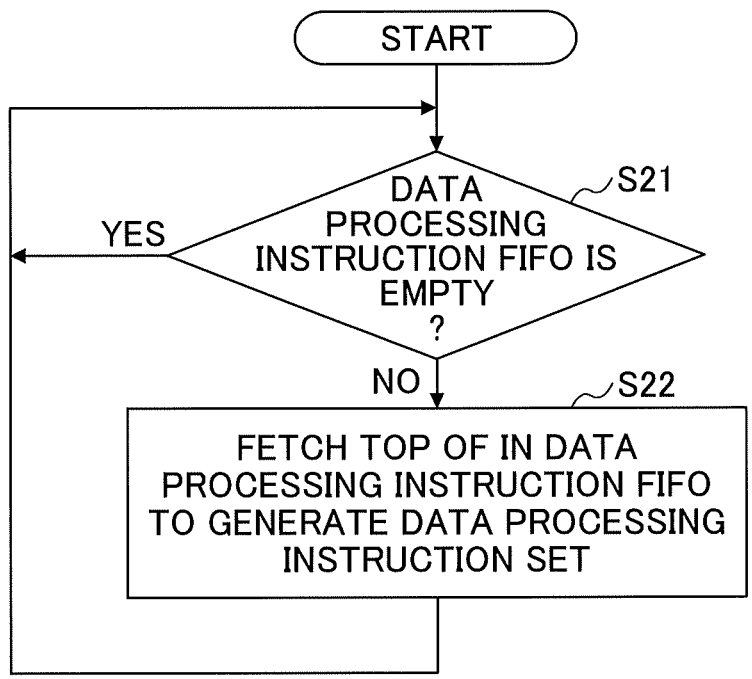
FIG. 4 is a flowchart for illustrating an exemplary operation of an instruction generation unit in FIG. 2 according to one embodiment of the present disclosure.

FIG. 4 is a flowchart for illustrating an exemplary operation of the instruction generation unit in FIG. 2. Specifically, FIG. 4 illustrates an exemplary control method for the arithmetic processor.

At step S21, the instruction generation unit repeats to detect whether the data processing instruction FIFO is empty. If it is detected that the instruction information is stored in the data processing instruction FIFO, at step S22, the instruction generation unit fetches information from the top of the data processing instruction FIFO to generate a data processing instruction set and returns to step S21.

Figure 5:
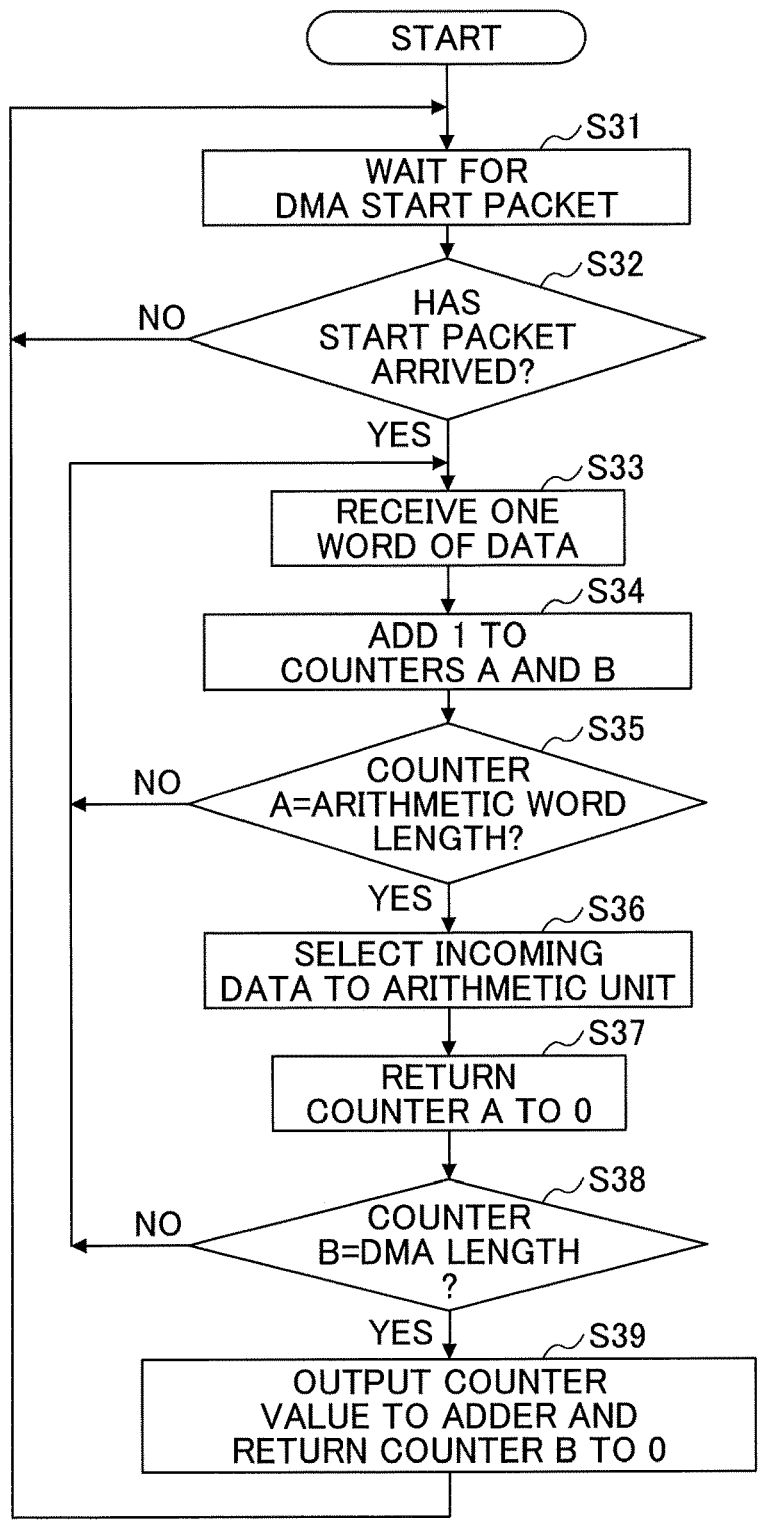
FIG. 5 is a flowchart for illustrating an exemplary operation of a sequencer in FIG. 2 according to one embodiment of the present disclosure.

FIG. 5 is a flowchart for illustrating an exemplary operation of the sequencer in FIG. 2. Specifically, FIG. 5 illustrates an exemplary control method for the arithmetic processor.

At step S31, the sequencer waits arrival of information from the instruction generation unit. At step S32, the sequencer determines whether a start packet has arrived based on the information received from the instruction generation unit and if the start packet has arrived, proceeds to step S33. On the other hand, if the start packet has not arrived, steps S31 and S32 are repeated.

If the data processing unit has received one word of data at step S33, the sequencer increments counters A and B by "1" at step S34. If counter A reaches the arithmetic word length at step S35, the sequencer proceeds to step S36. On the other hand, if counter A does not reach the arithmetic word length, the sequencer returns to step S33. Here, the increments of counters A and B may be performed based on the remaining amount of the data processing FIFO.

At step S36, the sequencer determines that data required for operations has been provided in the data processing FIFO and provides a selection control signal to the data selection unit for causing the data selection unit to input data in the data processing FIFO to the arithmetic unit. Then, at step S37, the sequencer resets counter A to the initial value "0".

Next, if counter B reaches the DMA length at step S38, the sequencer proceeds to step S39. On the other hand, if counter B does not reach the DMA length, the sequencer returns to step S33. At step S39, the sequencer provides the counter value of counter B to an adder to cause the adder to generate a reply address based on a reply base address, resets counter B to the initial value "0" and returns to step S31.

In this manner, according to the first embodiment, the upper node can process data transferred in the DMA corresponding to the instruction information embedded into the DMA header. Specifically, an arbitrary operation can be inserted between two DMA transferring occasions without pre-configuration. Since the data and an instruction for causing the arithmetic unit to process the data can be integrally transferred, the correspondence between the DMA-transferred data and the instructions for processing the data can be easily and securely stored.

Second Embodiment

FIG. 6 illustrates an exemplary system SYS according to the second embodiment. Elements similar to those of the first embodiment are not described in detail. In the second embodiment, an upper node has multiple PCIe interface units (2-1), (2-2) and (2-3) and includes start packet detection units and data processing instruction FIFOs corresponding to the respective PCIe interface units (2-1), (2-2) and (2-3). Also, the upper node has an instruction generation unit and a data processing unit that are shared among the PCIe interface units (2-1), (2-2) and (2-3). For example, the respective start packet detection units, the respective data processing instruction FIFOs, the instruction generation unit and the data processing unit are included in an arithmetic processor arranged with a CPU, a GPU, a dedicated hardware logic or the like installed in the upper node.

The PCIe interface unit (2-1) is coupled to the PCIe device 1 serving as a lower node via a PCIe bus. The PCIe interface unit (2-2) is coupled to the PCIe device 2 serving as a lower node via a PCIe bus. The PCIe interface unit (2-3) is coupled to the PCIe device 3 serving as a lower node via a PCIe bus.

In the case where the PCIe interface units (2-1), (2-2) and (2-3) are described below without distinction, they may be referred to as the PCIe interface unit (2). Note that the number of the PCIe interface units (2) included in the upper node is not limited to the embodiment as illustrated in FIG. 6.

Configurations and functionalities of the PCIe interface units (2), the start packet detection units and the data processing instruction FIFOs are the same as those of the PCIe interface unit (2), the start packet detection unit and the data processing instruction FIFO in FIG. 2. Exemplary configurations and functionalities of the instruction generation unit and the data processing unit are described with reference to FIG. 7.

FIG. 7 is a block diagram for illustrating an example of the instruction generation unit and the data processing unit in FIG. 6. Functionalities similar to the instruction generation unit and the data processing unit described with reference to FIG. 2 are not described in detail.

The instruction generation unit has a functionality of generating a data processing instruction set based on information stored in each of the three data processing instruction FIFOs corresponding to the PCIe interface units (2-1), (2-2) and (2-3).

The data processing instruction set generated by the instruction generation unit includes data destination device selection information in addition to the information on the data processing instruction set generated by the instruction generation unit in FIG. 2. The data destination device selection information is information to identify to which PCIe devices (lower nodes) and/or which registers in the upper node the arithmetic unit transmits operation results.

For example, whenever information is fetched from each of the three data processing instruction FIFOs, the instruction generation unit generates the data destination device selection information.

The data processing unit has three data processing FIFOs (FIFO 1, FIFO 2 and FIFO 3) corresponding to the three start packet detection units as well as internal registers providing storage areas in the upper node for the data processing FIFOs in FIG. 6, for example. Also, the data processing unit has a data selection unit, a sequencer, an arithmetic unit, a data distribution unit, an adder and three packet generation units corresponding to the three PCIe devices, for example.

Configurations and functionalities of the respective data processing FIFOs, the respective registers, the sequencer, the adder and the respective packet generation units are similar to those of the data processing FIFO, the respective registers, the sequencer, the adder and the packet generation unit as illustrated in FIG. 2. Note that counter A in the sequencer outputs a selection control signal for causing the data selection unit to select data from the data processing FIFO corresponding to the PCIe device 1 if the data source device selection information is indicative of the PCIe device 1.

The data selection unit has functionalities similar to those of the data selection unit in FIG. 3, excluding selection of data fetched from one of the data processing FIFOs based on the selection control signal for each reception of the selection control signal. The data distribution unit provides operations results from the arithmetic unit to the packet generation unit corresponding to the PCIe device indicated in the data destination device selection information. For example, the data destination device selection information may indicate one or more of the PCIe devices.

If an instruction is stored in any of the data processing instruction FIFOs and resources required to execute the stored instruction are not used for other instructions, the instruction generation unit fetches the instruction from the data processing instruction FIFOs. Then, if an arithmetic operation can be executed in accordance with the fetched instruction, the instruction generation unit fetches a data processing instruction set to cause the data processing unit to perform the operation for the instruction. For example, if a common instruction is stored in each of the corresponding data processing instruction FIFOs from the multiple PCIe devices, the instruction generation unit waits storage of the common instruction in the data processing instruction FIFOs and then outputs a data processing instruction set for causing the data processing unit to process the common instruction.

For example, the instructions fetched by the instruction generation unit from the data processing instruction FIFOs may include not only an instruction on arithmetic operations but also information indicative of source PCIe devices or internal registers of data for use in the arithmetic operations, information indicative of destination PCIe device or internal registers of operation results and information about the number of bits or the like after aggregation. In other words, the instruction generation unit may have functionalities of causing the data processing unit to execute common instructions such as an aggregation instruction transmitted from the multiple PCIe devices.

The data processing unit can sequentially perform arithmetic operations on each of multiple data pieces transferred from the PCIe device 1 in the DMA and each of multiple data pieces transferred from the PCIe device 2 in the DMA for aggregation. After that, the data processing unit can transmit aggregated data to the PCIe device 3. In this case, the PCIe device 1 and the PCIe device 2 store instruction codes for aggregation instructions, source node information for the aggregated data, destination node information of the aggregated data, the word length of the aggregated data or the like in areas of destination addresses "dstadr" in the DMA header. Note that information stored in the areas of the destination addresses "dstadr" may be an embodiment where all the source PCIe devices for DMA transferring store the same information or an embodiment where the multiple source PCIe devices for the DMA transferring store different values and use all the information pieces to arrange a single arithmetic instruction.

Also, the data processing unit can calculate the total value through integration or aggregation at the arithmetic unit of multiple data pieces transferred from the PCIe device 1 in the DMA and transmit the calculated total value to the PCIe device 2, for example. Furthermore, the data processing unit can use the arithmetic unit to perform arithmetic operations on the multiple data pieces transferred from the multiple PCIe devices in the DMA and transfer operation results to the multiple PCIe devices, for example. The data processing unit may calculate an average value, a maximum value, a minimum value or the like of data and transmit the average value, the maximum value, the minimum value or the like to a predetermined number of PCIe devices identified in the data destination device selection information.

Provision of the respective data processing FIFOs corresponding to the PCIe devices enables data to be stored for the respective PCIe devices. In this manner, dependency-free instructions can be executed in parallel.

Figure 8:
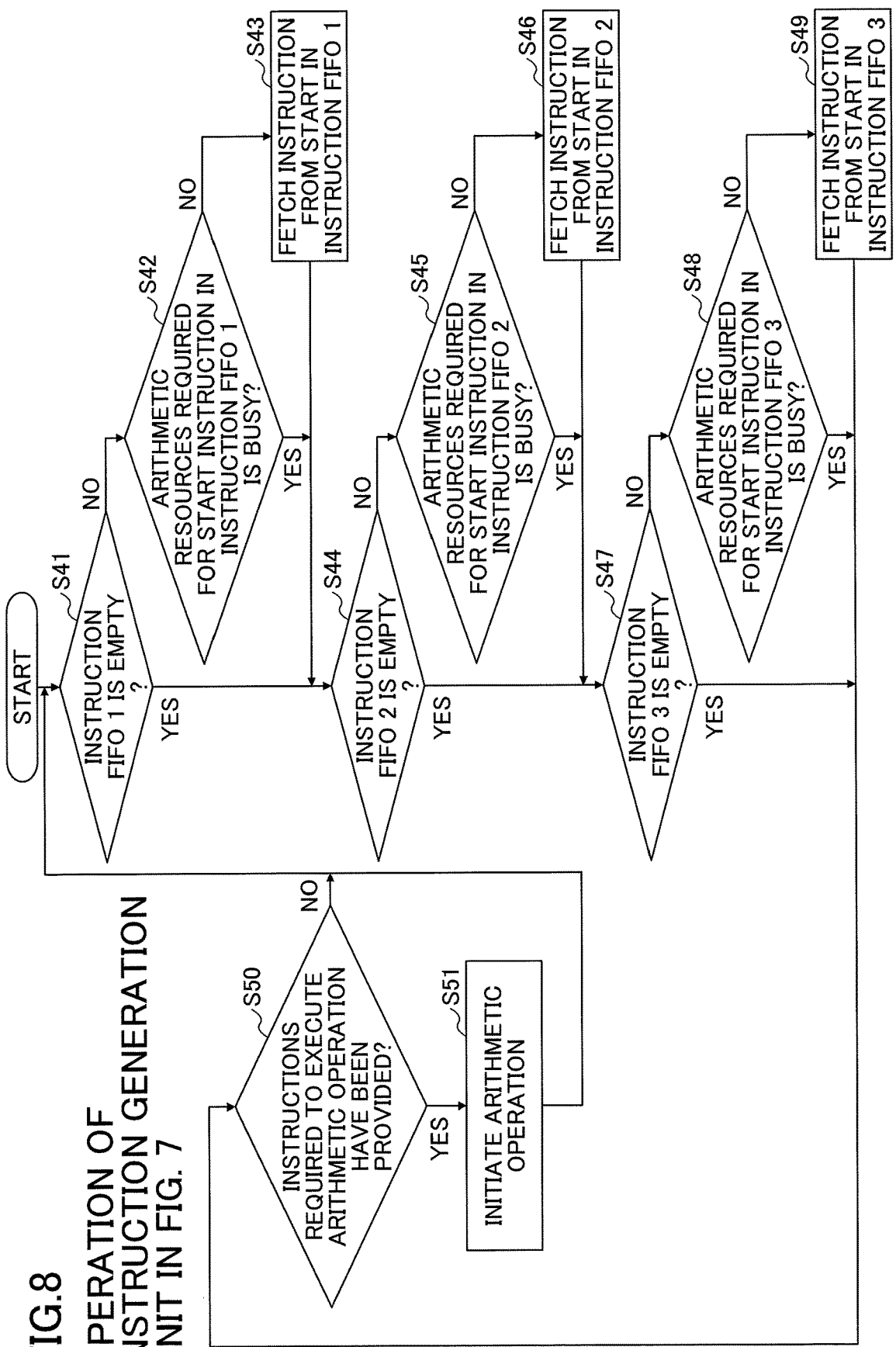
FIG. 8 is a flowchart for illustrating an exemplary operation of the instruction generation unit in FIG. 7 according to one embodiment of the present disclosure.

FIG. 8 is a flowchart for illustrating an exemplary operation of the instruction generation unit in FIG. 7. Specifically, FIG. 8 illustrates an exemplary control method for the arithmetic processor.

The instruction generation unit determines whether the data processing instruction FIFO 1 is empty at step S41 and if the data processing instruction FIFO 1 is empty, proceeds to step S44. On the other hand, if an instruction is stored, the instruction generation unit proceeds to step S42.

The instruction generation unit determines whether arithmetic resources required to execute the instruction stored at the top of the data processing instruction FIFO 1 are busy (in use) at step S42 and if the arithmetic resources are busy, proceeds to step S44. On the other hand, if the arithmetic resources are not busy (unused), the instruction generation unit proceeds to step S43. Here, the arithmetic resources may include an arithmetic element for use in arithmetic operations in the arithmetic unit, a register for use in arithmetic operations and so on. The instruction generation unit fetches an instruction to execute an arithmetic operation from the top of the data processing instruction FIFO 1 at step S43 and proceeds to step S44.

The instruction generation unit determines whether the data processing instruction FIFO 2 is empty at step S44 and if the data processing instruction FIFO 2 is empty, proceeds to step S47. On the other hand, if an instruction is stored, the instruction generation unit proceeds to step S45. The instruction generation unit determines whether arithmetic resources required to execute the instruction stored at the top of the data processing instruction FIFO 2 are busy (in use) at step S45 and if the arithmetic resources are busy, proceeds to step S47. On the other hand, if the arithmetic resources are not busy (unused), the instruction generation unit proceeds to step S46. The instruction generation unit fetches an instruction to execute an arithmetic operation from the top of the data processing instruction FIFO 2 at step S46 and proceeds to step S47.

The instruction generation unit determines whether the data processing instruction FIFO 3 is empty at step S47 and if the data processing instruction FIFO 3 is empty, proceeds to step S50. On the other hand, if an instruction is stored, the instruction generation unit proceeds to step S48. The instruction generation unit determines whether arithmetic resources required to execute the instruction stored at the top of the data processing instruction FIFO 3 are busy (in use) at step S48 and if the arithmetic resources are busy, proceeds to step S50. On the other hand, if the arithmetic resources are not busy (unused), the instruction generation unit proceeds to step S49. The instruction generation unit fetches an instruction to execute an arithmetic operation from the top of the data processing instruction FIFO 3 at step S49 and proceeds to step S50.

At step S50, the instruction generation unit determines whether instructions required to initiate an arithmetic operation are present or completed and if the instructions are present or completed, proceeds to step S51. On the other hand, if the instructions are not present or completed, the instruction generation unit returns to step S41. According to step S50, if common instructions for an aggregation instruction or the like are transmitted from the multiple PCIe devices, the instruction generation unit can wait arrival of these common instructions. The instruction generation unit is one exemplary waiting unit. Note that in the case where instructions are transmitted from only one PCIe device, the instructions would be stored in the data processing instruction FIFO, and when arithmetic resources become available, step S51 are performed. In this case, the same operations as those of the first embodiment are performed.

The instruction generation unit provides a data processing instruction set to the data processing unit at step S51 to cause the arithmetic unit to initiate an arithmetic operation and returns to step S41.

Figure 9:
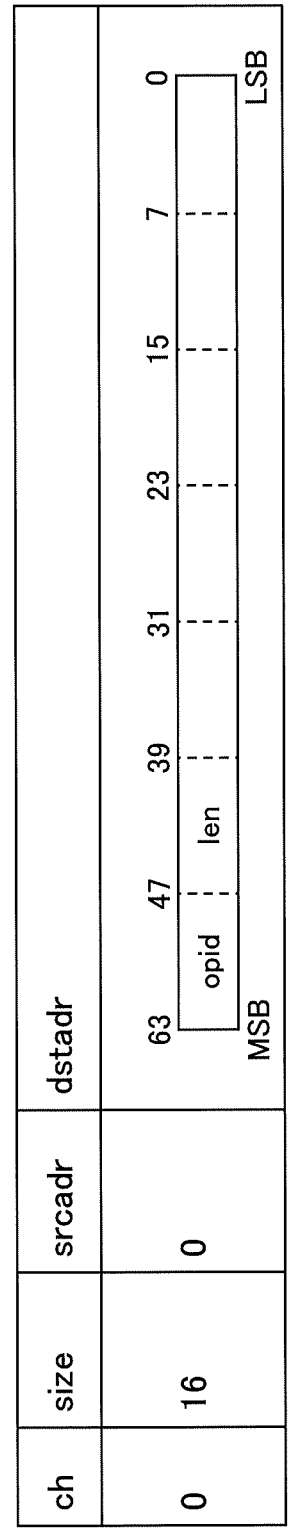
FIG. 9 illustrates exemplary information stored in a DMA header in a DMA request according to one embodiment of the present disclosure.

FIG. 9 illustrates exemplary information stored in a DMA header in a DMA request. In the example as illustrated in FIG. 9, the channel "ch" is set to "0", the transferring size "size" is set to "16", and the source address "srcadr" is set to "0". Also, the operation code "opid" is stored in eight bits in the MSB side in an area of the destination address "dstadr" (64 bits), and the arithmetic word length "len" is stored in the subsequent eight bits in the MSB side. The DMA header as illustrated in FIG. 9 is used for the first and second embodiments. Note that the respective numbers of bits of the operation code "opid" and the arithmetic word length "len" stored in the area of the destination address "dsradr" are not limited to 8 bits, and the storage locations thereof are not limited to the locations as illustrated in FIG. 9. Also, the types of information stored in the area of the destination address "dstadr" are not limited to the operation code "opid" and the arithmetic word length "len".

In this manner, according to the second embodiment, common instructions transmitted from the multiple PCIe devices can be waited for data processing, and the operation result can be transmitted to a predetermined PCIe device. Since data and instructions for causing the arithmetic unit to process the data can be integrally transferred at this time, correspondence between the DMA-transferred data and the instructions for processing the data can be easily and securely stored.

Third Embodiment

FIG. 10 illustrates an exemplary system SYS according to the third embodiment. Elements similar to the first and second embodiments are not described in detail. The system SYS according to the third embodiment is the same as the system SYS in FIG. 6, excluding addition of an operation database DB to the instruction generation unit provided in an upper node.

The third embodiment may be applied to cases where instructions and information required to execute the instructions cannot be stored in a storage area for the destination address "dstadr" (for example, 64 bits) in the DMA header. In FIG. 11, exemplary information stored in the DMA header in a DMA request and exemplary information stored in the operation database DB are illustrated.

The instruction generation unit reads instruction identification code "id" (FIG. 11) stored in an area of the destination address "dstadr" fetched from a data processing instruction FIFO. Then, the instruction generation unit uses the operation code "opid" and the arithmetic word length "len" stored in the operation database DB corresponding to the fetched instruction identification code "id" to generate a data processing instruction set.

FIG. 11 illustrates examples of the information stored in the DMA header in the DMA request and the information stored in the operation database DB according to the third embodiment. The same contents as FIG. 9 are not described in detail. In the DMA header, the instruction identification code "id" is stored in the area of the destination address "dstadr" (64 bits).

The operation database DB has multiple entries to store the instruction identification code "id", the operation code "opid" and the arithmetic word length "len", for example. Then, as described with reference to FIG. 10, the instruction generation unit fetches the operation code "opid" and the arithmetic word length "len" stored in the operation database DB corresponding to the instruction identification code "id" in the destination address "dstadr" fetched from the data processing instruction FIFO. Note that information stored in the operation database is not limited to the specific information pieces as illustrated in FIG. 11.

In this manner, according to the third embodiment, even if instructions and information required to execute the instructions cannot be accommodated in the area of the destination address "dstadr", the operation database DB can be used to cause the data processing unit to perform the instructions. As a result, for example, the data processing unit can be caused to execute complicated operations having a large number of parameters, which can improve the performance of an upper node.

Fourth Embodiment

FIG. 12 illustrates exemplary information stored in a DMA header in a DMA request according to the fourth embodiment. The same contents as FIGS. 9 and 11 are not described in detail. The configuration of a system SYS according to the fourth embodiment is the same as that of FIG. 10, excluding the instruction generation unit having different functionalities.

In the DMA header in FIG. 12, a flag "flg" and an instruction identification code "id" are stored in an area for a destination address "dstadr" (64 bits). For example, if the operation database DB is used, the flag "flg" is set to "1", and otherwise, the flag "flg" is set to "0".

If the flag "flg" is set to "0", the instruction generation unit operates similarly to the second embodiment without consideration of the instruction identification code "id". Also, if the flag "flg" is set to "1", the instruction generation unit operates similarly to the third embodiment based on the instruction identification code "id" with reference to the operation database DB.

As stated above, according to the above embodiments, it is possible to describe what operation is to be performed on data transferred in unit of DMA transferring (in unit of DMA header) in the DMA through integration with DMA transferring instructions. At this time, the data and an instruction for causing the arithmetic unit to process the data can be integrally transferred by embedding instruction information including the instruction or the like indicative of the operation into the destination address "dstadr" that is not used in the DMA header. As a result, correspondence between the DMA-transferred data and the instructions for processing the data can be easily and securely stored. Also, a lower node that transfers the data to an upper node can use a sequence similar to the normal DMA transferring at the start time of the DMA transferring to instruct the DMA controller to embed information. As a result, the data and the instructions can be transferred to the upper node in the DMA with the existing sequence using the existing DMA controller.

The present disclosure is not limited to the above-stated specific embodiments, and various variations and modifications can be made without deviating from the scope of claims.

What is claimed is:

1. A data transferring device, comprising:
   at least one first memory; and
   at least one controller configured to:
   receive a Direct Memory Access (DMA) request including at least a transferring size of data to be transferred, a source address indicating a start address of a storage area where the data to be transferred is stored, and a destination address indicating a start address of a storage area where transferred data is stored, said destination address including a value indicative of a processing instruction executed after completion of DMA; and
   increase, for a DMA transferring, the value;
   wherein the value is extracted and stored at least one second memory sequentially.

2. The data transferring device as claimed in claim 1, wherein the at least one controller is further configured to:
   generate a first packet including the value indicative of the processing instruction, and
   generate a second packet including an increased value of the processing instruction.

3. The data transferring device as claimed in claim 1, wherein the DMA request has an area for the destination address, and the area for the destination address stores the processing instruction.

4. A control method for a data transferring device, comprising:
   receiving a Direct Memory Access (DMA) request, wherein the DMA request has at least a transferring size of data to be transferred, a source address indicating a start address of a storage area where the data to be transferred is stored, and a destination address indicating a start address of a storage area where transferred data is stored, said destination address including a value indicative of a processing instruction; and
   increasing, for a DMA transferring, the value;
   wherein the value is extracted and stored at at least one memory sequentially.

5. The control method for the data transferring device as claimed in claim 4, further comprising:
   generating a first packet including the value indicative of the processing instruction, and
   generating a second packet including an increased value of the processing instruction.

6. The control method for the data transferring device as claimed in claim 4, further comprising:
   embedding the processing instruction into the destination address after a compression or a code conversion.

7. The control method for the data transferring device as claimed in claim 4, wherein the DMA request has an area for the destination address, and the area for the destination address stores the processing instruction.

8. A data transferring device, comprising:
   at least one memory; and
   at least one controller configured to:
   receive a Direct Memory Access (DMA) request, wherein the DMA request stores at least a transferring size of data to be transferred, a source address indicating a start address of a storage area where the data to be transferred is stored, and a destination address indicating a start address of a storage area where transferred data is stored, said destination address including a processing instruction executed after completion of DMA, and the processing instruction includes an operation for calculating at least one of a total value, an average value, a maximum value, or a minimum value of transferred data;
   wherein the processing instruction is extracted from the destination address.

9. The data transferring device as claimed in claim 8, wherein the at least one controller is further configured to generate a packet, wherein the packet has the processing instruction and data, and the data is processed based on the processing instruction.

10. The data transferring device as claimed in claim 8, wherein the destination address includes a value indicative of the processing instruction executed after completion of the DMA, and wherein the at least one controller is further configured to increase, for a DMA transferring, the value.

11. A control method for a data transferring device, comprising:
    receiving a Direct Memory Access (DMA) request, wherein the DMA request stores at least a transferring size of data to be transferred, a source address indicating a start address of a storage area where the data to be transferred is stored, and a destination address indicating a start address of a storage area where transferred data is stored, said destination address including a processing instruction executed after completion of DMA, and the processing instruction includes an operation for calculating at least one of a total value, an average value, a maximum value, or a minimum value of transferred data;
    wherein the processing instruction is extracted from the destination address.

12. The control method for the data transferring device as claimed in claim 11, further comprising:

generating a packet, wherein the packet has the processing instruction and data, and the data is processed based on the processing instruction.

13. The control method for the data transferring device as claimed in claim 11, wherein the destination address includes a value indicative of the processing instruction executed after completion of the DMA, and the method further comprises:

increasing, for a DMA transferring, the value.

14. The control method for the data transferring device as claimed in claim 11, wherein the DMA request has an area for the destination address, the source address, and the transferring size, and the processing instruction is stored at the area for the destination address.

15. A data processing device, comprising:
at least one memory; and
at least one processor configured to:
detect a packet having a processing instruction and data, wherein the processing instruction is stored at an area for a destination address of a Direct Memory Access (DMA) request to transfer data from a first node to a second node, wherein the Direct Memory Access (DMA) request stores at least a transferring size of data to be transferred, a source address indicating a start address of a storage area where the data to be transferred is stored, and a destination address indicating a start address of a storage area where transferred data is stored;

wherein the processing instruction is extracted from the destination address.

16. The data processing device as claimed in claim 15, wherein the at least one processor is further configured to extract the processing instruction from the area for the destination address of the packet.

17. The data processing device as claimed in claim 16, wherein the at least one processor is further configured to store the processing instruction at a FIFO.

18. The data processing device as claimed in claim 15, wherein the destination address includes a value indicative of the processing instruction executed after completion of the DMA, and the value is increased for a DMA transferring.

19. The data processing device as claimed in claim 15, wherein the processing instruction includes an operation for calculating at least one of a total value, an average value, a maximum value, or a minimum value of transferred data.

20. The data processing devise as claimed in claim 15, wherein the at least one processor is further configured to process the data based on the processing instruction.

* * * * *